United States Patent
Baldwin et al.

[11] Patent Number: 5,943,636
[45] Date of Patent: Aug. 24, 1999

[54] METHOD AND APPARATUS TO CALIBRATE AND RUN OPTICAL DELAY DEVICES

[75] Inventors: David L. Baldwin; David A. Bailey, both of Glendale, Ariz.

[73] Assignee: Honeywell Inc., Minneapolis, Minn.

[21] Appl. No.: 08/900,245

[22] Filed: Jul. 24, 1997

[51] Int. Cl.[6] .......................... G06F 15/20; H04B 10/08
[52] U.S. Cl. .......................... 702/85; 702/104; 702/119; 385/76; 385/88; 359/123; 359/128; 371/27.5
[58] Field of Search .......................... 364/571.01–571.05; 371/5.5, 22.36, 27.5; 356/39; 340/870.04; 385/16, 76, 88; 359/123, 117, 128, 140; 702/104, 91, 119, 85

[56] References Cited

U.S. PATENT DOCUMENTS 4,028,702  6/1977  Levine .
5,682,038  10/1997  Hoffman .............................. 250/458.1
5,724,363  3/1998  Breya .................................. 371/5.5

OTHER PUBLICATIONS

A. Kumar, "Antenna Design With Fiber Optices" publisher Artech House, Norwood, MN 1996 Patent application 08/627,867 by Ang et al entitled "Variable Time Delay for Optic Devices" filed Apr. 3, 1996.

*Primary Examiner*—Damini Shah
*Attorney, Agent, or Firm*—Charles J. Ungemach

[57] ABSTRACT

A calibrate and run bias voltage control method for an optical delay system utilizing a plurality of voltage controlled switches which may experience bias drift wherein during calibration an output optical power error signal of the system is monitored while rapidly changing the bias voltages to the switches according to a desired algorithm and setting the bias voltages at a the level achieved when the output error signal falls below a predetermined tolerance level.

14 Claims, 5 Drawing Sheets

METHOD AND APPARATUS TO CALIBRATE AND RUN OPTICAL DELAY DEVICES

CROSS REFERENCE TO RELATED APPLICATIONS

Application Ser. No. 08/627,867, filed Apr. 3, 1996 entitled "Variable Time Delay for Optic Devices" by Ang et al; application Ser. No. 08/601,413 entitled "Dual Signal Subharmonic Carrier For Systems with Unknown Delay" by Bailey and an application Ser. No. 08/921,788, filed Sep. 2, 1997 entitled "False Null Prevention in Optical Delay Line Calibration"—by Baldwin et al all of which are assigned to the assignee of the present invention.

UNITED STATES GOVERNMENT RIGHTS

The United States Government has rights in this invention pursuant to a Contract awarded to the employer of the inventors herein.

BACKGROUND OF INVENTION

1. Field of the Invention

This invention relates to time delay circuits for optical devices and more particularly to a method and apparatus to overcome problems associated with the drift of the bias voltages in optical switches and allow the calibration of the circuit during use so that the system may continue running without returning to the laboratory for re-calibration or without having excessive components which add to the weight, space and power consumption of the system.

2. Description of the Prior Art

Fiber optic systems have become common and find many uses as, for example, in communications, signal processing and detection. In such systems, light sources are employed which often are modulated (digital, amplitude, frequency or phase) to delays are utilized in many systems such as for steering the direction of a radar or microwave beam in a Phased Array Antenna for both transmitting and receiving modes, for optical path matching in a distributed optical sensing system using a light source with either low coherence (e.g. LED) or high coherence (e.g. laser), or for sampling the airspeed at a particular distance window ahead of a craft using a laser Doppler velocimeter (air data sensor). At the present time, variable optical delay devices are available in the form of a plurality of optical lines each of different length and one of the lines is used for each delay time desired. When a large number of delay times is desired, such systems become impractical. For example, if it is desired to provide 32 different delay times, the prior art would have to utilize 32 different lines in some sort of package. This also requires some sort of switching arrangement to choose the proper line and may require 32 identical light sources, such as laser diodes, all modulated on the same carrier frequency. It will be appreciated that the cost and complexity of such systems becomes prohibitive. While theoretically possible to use a single source and a switch that could connect it to one of the 32 lines, at this stage of the art such switches would have to be mechanical (and thus slow) or tiers of 2×2 integrated optic switches as described in—Chapter 6 pages 153–155 of a book entitled "Antenna Design With Fiber Optics" by A. Kumar and published in 1996 by Artech House of Boston and London (Library of Congress Catalog Card Number 95-49990). Unfortunately, optical delay systems using such switches would involve a great deal of light loss.

A solution to this problem is described and claimed in the above mentioned Ang et al application by providing a time delay unit with a switch and two paths for a light beam, which, for convenience, will be called an upper and a lower path, the upper path being longer than the lower path by an amount sufficient to produce a predetermined delay of the beam in the upper path with respect to the beam in the lower path. The switch, when properly biased, will cause the beam to stay in one path through put or cross to the other path (cross circuit) or, in other words, to stay in the upper or lower path or to change paths from lower to upper or vice versa. In order to provide a number of different time delays, more of the delay units can be activated to effect various combinations of delay and produce a desired overall delay. For example, if 64 different time delays were desired, six time delay units may be used in series and the basic time delay T can be transformed to a delay of T×($2^6$) different values. The minimum delay being 0×T and the longest delay being 63×T. For manufacturing simplicity, each time delay unit may be made up of one or more of the basic units. Thus, in binary fashion, the first unit may be one basic unit, the second unit may be two basic units, the third may be four basic units etc. The advantages of using optical carrier is making possible switching ease, high speed, providing a large dynamic range of delays (i.e. picoseconds to milliseconds) with little or no dispersion due to different modulation frequencies (i.e. time delay at 1 Ghz will be the same as the time delay at 100 Ghz.), modulated signal microwave ripple and deviation from linear phase independent of time delay, and savings in space and weight. Of course, it will be realized that a binary circuit is not required and other arrangements of different length fibers may be use to obtain desired overall delay times.

While providing a great advantage over presently available delay devices, the bias voltages applied to the switches of the above described Ang et al system may drift over time with the result that the light does not go solely to the correct path (a significant portion of the light could leak to the wrong path if the switches are not properly adjusted) and the performance of the system is degraded. While previous systems could be returned to the laboratory for recalibration, this is highly undesirable. With available integrated optical switches the drift is so bad that the desired high performance can not be realized without some sort of in situ recalibration. It might be possible to calibrate the switches in situ by providing individual monitors for each output port of each light switch to correct any drift occurring in that switch but having a separate monitor for each of the switches would be very much more costly in terms of size, weight and power consumption than is desirable.

SUMMARY OF THE INVENTION

The present invention provides a method and apparatus for correcting any bias drift in the system while it is being used so that it may be calibrated in situ and run without removal and without the cost, weight, size, power consumption, and complexity (which degrades reliability) of individual switch monitoring. More particularly, calibration is performed by one of several algorithms which monitor the final output and compare it with a tolerance or threshold value. When the value exceeds the tolerance value, calibration is performed, for example by a random search program in a very short time which allows the system to continue being run. In some cases, there may be a small percentage of the time (e.g. 1%, whether it be microseconds, seconds, or minutes) when the system does not need to be running. The present invention can perform the calibration during the 1% of the time. In other cases, calibration may be performed continuously during operation with acceptable performance without stopping the run at all.

In the present invention we provide feedback from the final output and adjust all of the switch biases using an algorithm such as "random search calibration" or "gradient search calibration". The calibration is performed when called for or needed and the bias values are stored and used during the run. This approach is far less complex, costly and uses far less weight, space and power than using optical feedback at each switch.

DETAILED DESCRIPTION OF THE PREFERRED EMBODIMENTS

Figure 1:
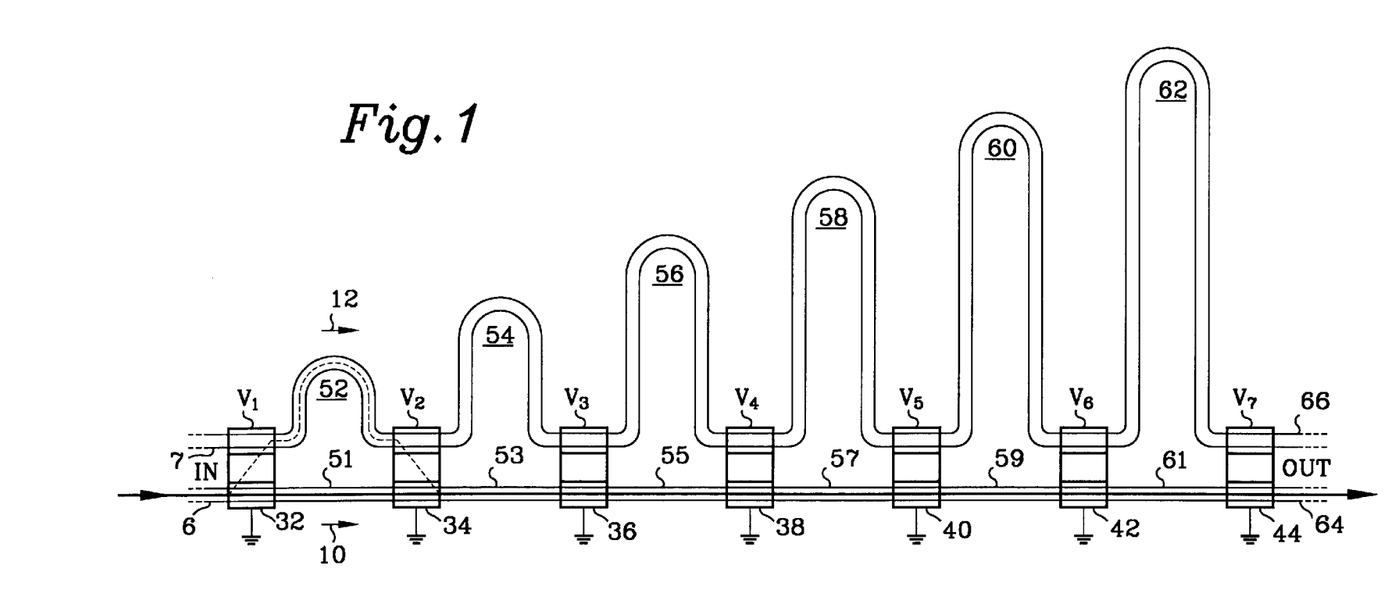
FIG. 1 is a schematic diagram of the variable time delay optical system of the Ang et al application.

FIG. 1 is a redrawing of one embodiment of the invention of Ang et al application described above. This figure includes a pair of input fibers 6 and 7 feeding into lower and upper paths 10 and 12 respectively through seven integrated optical switches 32, 34, 36, 38, 40, 42 and 44 interconnected by six pairs of optical fibers 51–52, 53–54, 55–56, 57–58, 59–60, and 61–62. It will be seen that the lower path 10 contains the short fibers 51, 53, 55, 57, 59 and 61 while the upper path 12 contains the longer fibers 52, 54, 56, 58, 60 and 62 of different lengths so as to create the relative time delays. The switches 32–42 are designed with two conditions or states of interest: in one state they direct input light straight through the upper or lower paths or, in a different state, they direct the light to cross over with the lower input going to the upper output or the upper input going to the lower output. In FIG. 1, the first optical fiber 6 is shown receiving an input from a source such as a laser modulated by a microwave signal generator (not shown). For convenience, it will be assumed that the input is received entirely by fiber 6 with no light into fiber 7. Fiber 6 feeds into the lower path 10 shown by a solid line and enters optical switch 32. Depending on the voltage $V_1$ applied to switch 32, the light may leave in short fiber 51 or, may cross over, as shown by the dashed line to the longer fiber 52. In either event, the light will then enter switch 34 and again, depending on the voltage $V_2$, leave switch 34 either as a pass through signal to the longer fiber 54 in the upper path 12 or, as shown by the dashed lines, as a cross over signal to the short fiber 53 in the lower path 10. This continues through switches 36–44 until light emerges from switch 44 on a lower output line 64 or on an upper output line 66. For convenience, the final output for all time delay states will be presumed to be substantially entirely in the output fiber 64, while output fiber 66 will have substantially no signal so long as the system is operating satisfactorily. The small amount of light that does leak from any of the switches and finally exit from the upper fiber 66 is unwanted leakage which is to be monitored and used as an error signal to be described below.

It is seen that in the lower path 10, light passes straight through switches 32–44 in the shortest distance and the time it takes for light to pass through this shortest path 10 is the reference time for all time delays. In FIG. 1 where the light crosses up so that it travels from switch 32 through a first curved fiber loop 52 to switch 34 and then back down to the lower path 10 where it stays to the output 64, the difference in optical path length between this path the reference path 10 causes a first time delay.

The longest time delay is formed by crossing over in switch 32 from fiber 6 to fiber 52, an thereafter passing straight through the upper path in switch 34. After leaving switch 34, the light would pass through a second curved loop 54, which is shown to be longer than loop 52, to switch 36. After leaving switch 36, light would pass through a third curved loop 56, which is shown longer than loop 54, to switch 38. After leaving switch 38, light would pass through a fourth curved loop 58, which is shown longer than loop 56, to switch 40. After leaving switch 40, light would pass through a fifth curved loop 60, which is shown longer than loop 58, to switch 42. Finally, after leaving switch 42, light would pass through a sixth curved loop 62, which is shown longer than loop 60, to switch 44. Switch 44 then crosses the light down to fiber 64 so that it may proceed to a final utilization device (not shown) or may proceed to further time delay units (not shown) with or without crossing over in the last optical switch.

A large number of time delays are formed by setting different optical switches in the straight through or crossover condition.

While fiber loops 52–62 have been shown to be all of different lengths, some or all of them may all be of the same length or they may be progressively shorter. The combinations can be made up in any desired arrangement and the lengths chosen to provide the desired time delays. One particularly preferred arrangement is to make loop 54 long enough to produce twice the delay of loop 52, loop 56 long enough to produce twice the delay of loop 54, loop 58 long enough to produce twice the delay of loop 56, loop 60 long enough to produce twice the delay of loop 58 and loop 62 long enough to produce twice the delay of loop 60, in binary fashion. With this arrangement, a plurality of substantially identical basic loops can be produced to the same specifications for manufacturing ease and then be connected together to form the successive time delay loops. Loop 52 would have 1 basic unit, loop 54 would have 2 basic units, loop 56 would have 4 basic units, loop 58 would have 8 basic units, loop 60 would have 16 basic units and loop 62 would have 32 basic units. This greatly simplifies the manufacture of the units and when so connected, by properly activating various ones of switches 32–44 causes the light to pass through various ones of the different lengths of loops 52–62, and 64 different amounts of delay can be obtained. It should be realized that more or fewer delay units may be used to provide as many different delays as desired all using a pair of light paths and a switch each capable of determining which of two paths to follow.

Each of the switches 32–44 are shown receiving one of the voltages V1–V7 across its terminals. The voltage for each switch is set by the operator or by an autonomous system based upon the desired delay. Each voltage will be set at a magnitude necessary to cause the switch to be in one of the two operating conditions i.e. through-put (TP-where the output light signal exits on the same level as the input) or cross-coupled (XC-where the signal exits on the opposite level as the input).

Unfortunately, over a period of time, the optimum voltage for best performance drifts and causes the input signal to be split between the upper and lower outputs resulting in a degradation of the final output in fiber 64 of lower path 10 and producing an unwanted light leakage in the fiber 66 of upper path 12. In the worst case, the system becomes inoperable and has to be returned to the laboratory for repair such as replacing one or more of the optical switches.

The present invention is a Calibrate and Run (C&R) method which operates by periodically recalibrating the optimum bias voltages, storing the voltages used and then running the variable time delay device using the stored voltages for a while until calibration is needed again. Flow diagrams for the Calibrate and Run system are seen in FIGS. 2, 3, and 4.

Figure 2:
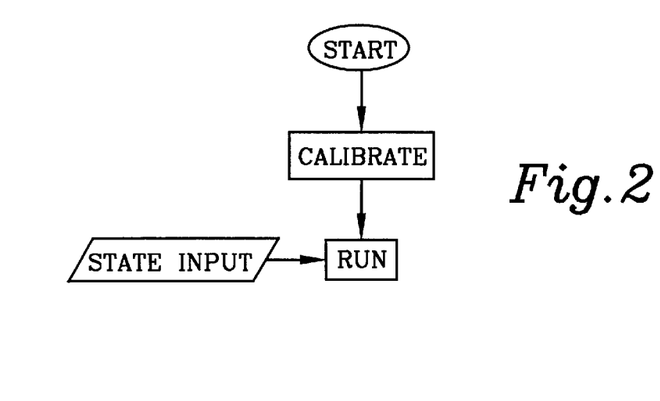
FIG. 2 is a flow diagram for a simplified calibrate and run system.

In FIG. 2, a simple Calibrate and Run system is shown. The system is started on power up, and in the short time before higher level system operation (not shown) is begun, the calibration routine is executed in accordance with a predetermined routine to be described. The calibration, in this case, occurs only once each time the system powers up. After calibration, the State Input box shown in FIG. 2 tells the system what amount of delay is desired and the Run box operates to set the switch bias voltages to provide that desired delay. The higher level system may direct different delay states with rapid switching time (e.g. nanoseconds to milliseconds) between different time delay states. The calibration must be such that it gives adequate system performance for all possible time delay states. The system is then run with the user changing time delay states as he wishes until such time as the power down occurs. If the bias voltages drift, the system will recalibrate on the next power up.

Figures 3, 4:
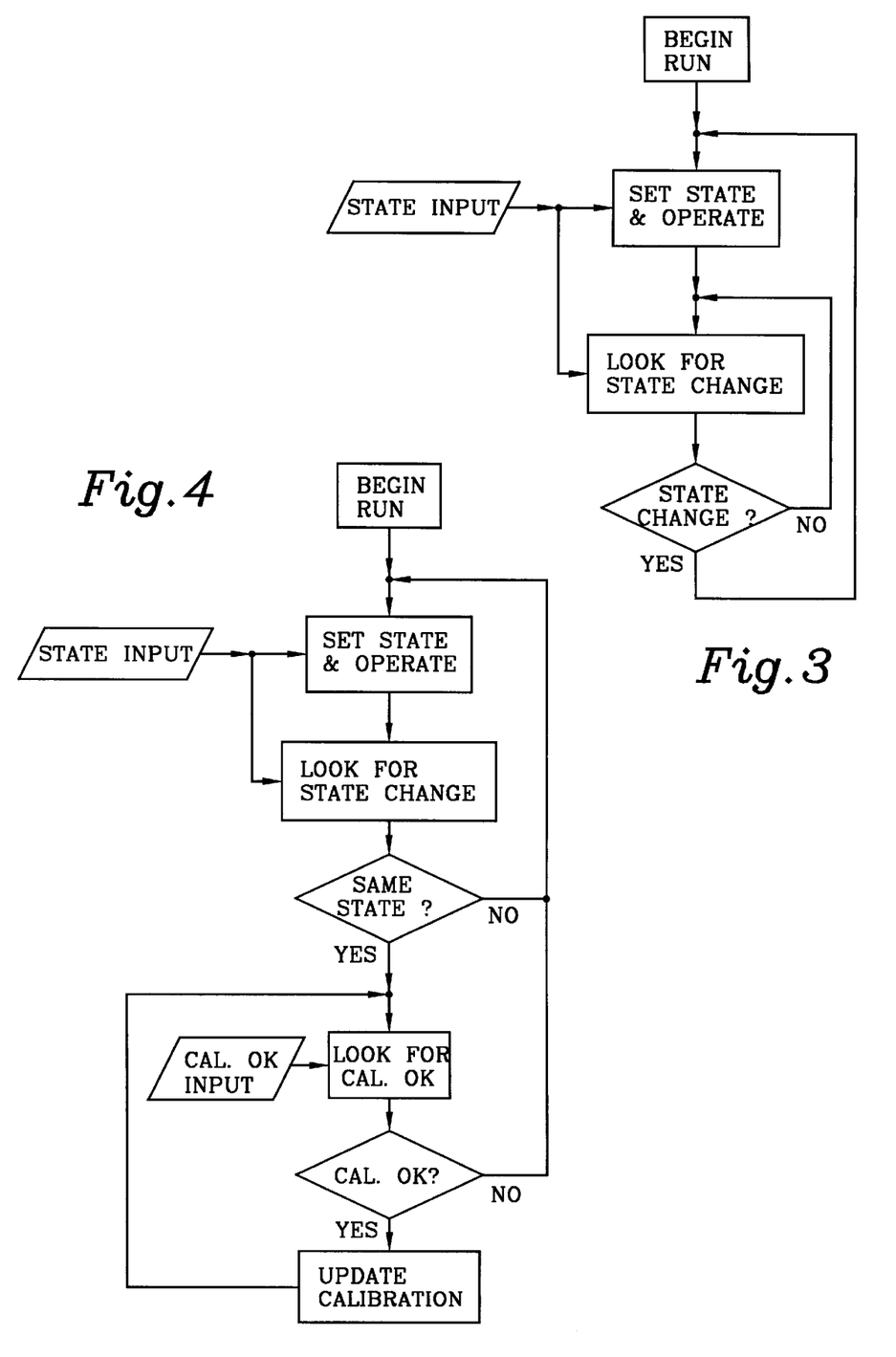
FIG. 3 is a flow diagram for the run portion of FIG. 2.
FIG. 4 is a flow diagram for a modified run mode with calibration updates.

The run mode is seen in more detail in FIG. 3 where after a normal run is begun, the State Input is presented to a Set State and Operate box which provides the bias voltages to set the switches at the desired positions to accomplish the desired delay. This system continues to operate at this delay while a box "Look for State Changes" detects when a different delay is desired. This is fed back to the Set State and Operate box where the variable time delay device translates the time delay state into corresponding states for multiple switches and change states within the allotted setup time. The system holds that new state and continues to operate in it until the input state command changes again. If no state input change is received, the system continues to operate at the previously set delay until power down.

FIG. 4 illustrates a modified run mode with calibration updates which can occur at predetermined times without having a power down and power up sequence. The first part of the procedure is seen to be the same as in FIG. 3 and will not be further described. The calibration update procedure is as follows:

A. A customer determined signal from a Cal OK input box indicates when calibration is allowed. The Look for Cal OK box sends a signal to the Cal OK? box which determines if calibration is OK or not.

1. If calibration is not OK, then control returns to the beginning of Run.
2. If calibration is OK, then a signal is sent to the Update Calibration box and the calibration is updated in a manner which will be described hereinafter. Meanwhile, the variable time delay circuit continues to monitor the Cal OK signal. Whenever the signal indicates calibration is not OK, the system suspends calibration immediately and returns control to the beginning of Run where the Set State & Operate box uses the latest commanded state input from the State Input box and operation continues. Small changes in the bias voltages may be made continuously for fine tuning performance during operation for performance even better than the minimum specification. Larger corrections would still be reserved for times when Cal OK is confirmed.

Figure 5:
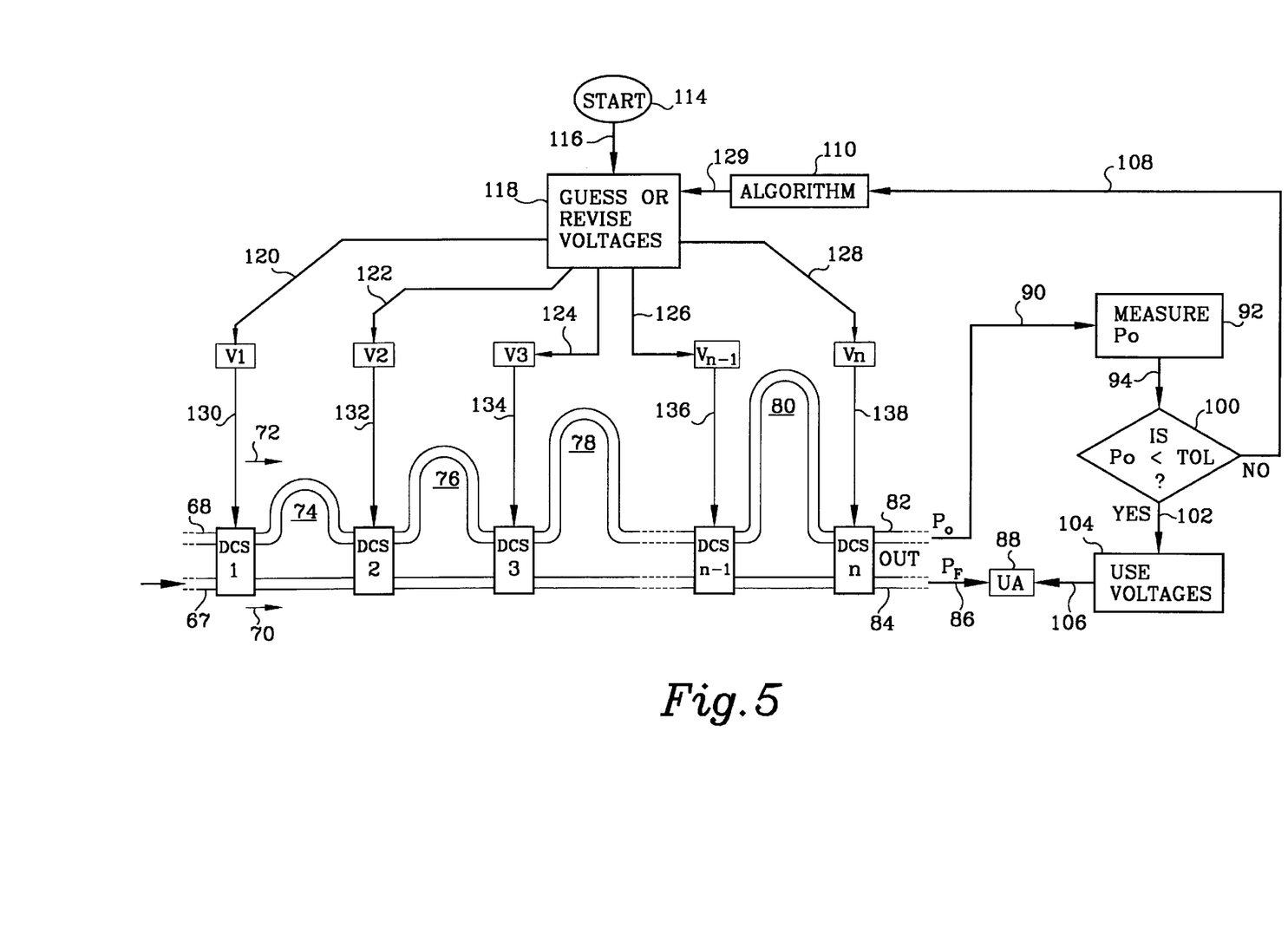
FIG. 5 is a schematic diagram of variable optical delay system utilizing the calibration apparatus of the present invention.

A basic system for calibrating the variable time delay apparatus according to the present invention is shown in FIG. 5 wherein a lower fiber 67 is shown receiving an input signal in a manner similar to fiber 6 of FIG. 1. Input fiber 67 provides an input to a lower path 70 which, like path 10 of FIG. 1, is the short, more or less a straight path. As before, no input signal is received in the other input fiber 68. An upper path 72 which, like path 12 of FIG. 1, consists of a plurality of different length loops 74–80 is operable in accordance with the state of the various switches to provide various time delays necessary to produce the final desired time delay at the output shown on fibers 82 and 84. The light switches of FIG. 5 are shown as Directional Coupler Switches, $DCS_1$ through $DCS_n$, which operate with the application of bias voltages, V1–Vn, as in FIG. 1 to either pass the signal through in the same path or cross the signal to the other path. While the switches are shown as directional coupler switches (DCS), it will be understood that other light switches such as Mach Zender (MZ) interferometers, or even bulk Pockel's cells may also be used. One particularly advantageous switch is of a type known as an integrated optical reverse delta-beta directional coupler switch. A reverse delta-beta directional coupler switch has two sets of electrodes to which is applied voltages of opposite polarity and nominally equal magnitude. When drift occurs, however, the voltages may need to become different by a small amount "delta V". Then, by adjusting "delta V", the bias may be controlled and the switch restored to acceptable performance.

Assuming again that after leaving the last switch, $DCS_n$ the final output identified as $P_F$ is intended to be substantially entirely in fiber 84 so as to provide a signal shown by arrow 86 to downstream utilization apparatus shown as box 88. When there is a leakage, an error signal will occur in fiber 82. This signal is identified as $P_0$ and is shown by an arrow 90 in FIG. 5. Ideally the leakage should be substantially zero.

The error signal on output arrow 90 is presented to a box 92 which measures the error signal and provides an output indicative thereof on a line shown by arrow 94. If the signal on line 94 is above zero by more than a predetermined value, it is indicative that an unacceptable bias change has occurred in one or more of the DCS switches. This is determined by a logic box 100 which is connected to receive the signal on line 94 and to compare it with a tolerance signal TOL. If $P_0$ is less that TOL, no recalibration is necessary and an output is presented on a line 102 to a Use Voltages box 104 which may inform the downstream utilization apparatus via a line shown as arrow 106, that the signal on line 86 is OK and that the output signal may be used. As mentioned, in some systems where power consumption is not as critical, the calibration can be continuous and the connection 106 to tell the utilization device 88 that the bias is OK need not be used.

In the event that $P_0$ is greater than TOL, then the signal from box 100 appears on a line 108 to an algorithm box 110. Algorithm box 110 will operate in accordance with one of the algorithms to be described to recalibrate the switches $DCS_1$–$DCS_n$. For example, one technique known as "Random Search Calibration" which will be further described in connection with FIG. 6, involves the use of a multi-dimensional hypercube of bias voltages centered about the best set of voltages to date. The hypercube has one dimension for each switch and operates to change the voltages applied thereto. (If the switch is a reverse-delta-beta optical switch, there are two voltages that may be changed per switch). Test voltages are randomly generated uniformly distributed within the hypercube, a set of these voltages is applied to the switches, and the resulting output $P_0$ is evaluated in the above described system for light leakage error signal.

The first time calibration is performed, start box 114, shown connected to "Guess or Revise Voltages" box 118 leading to voltages $V_1$–$V_n$ via lines 120–128, applies an initially guessed set of voltages as bias to switches $DCS_1$–$DCS_n$ via lines 130–138. Later after there has been some operation for a particular delay time, the Guess or Revise Voltages box will supply the last known bias values as a starting point. This is shown in FIG. 5 by a line 129 from Algorithm box 110 to the Guess or Revise Voltages box 118. When these voltages are applied, logic box 100 determines if $P_0$ is less than TOL and if it is not, Algorithm box 110 sends a signal, via line 129, to the Guess or Revise Voltage box 118 which operates through lines 120–128 to change the bias voltages, $V_1$–$V_n$, through lines 130 to 138 to switches $DCS_1$–$DCS_n$ respectively. If the leakage $P_0$ on the monitor port (line 90) is less than the previous leakage, then the center of the hypercube is moved in the direction of the last used voltages and a new set of voltages within a new range from the new point is generated and applied to the switches $DCS_1$–$DCS_n$. This is repeated very rapidly until the leakage results in a signal $P_0$ which is less than TOL and the system is considered acceptable so that the Use Voltages box 104 can inform the utilization apparatus 88 via line 106 that the voltages are acceptable.

The second time calibration is performed, the values previously used are applied to the switches $DCS_1$–$DCS_n$ by Guess Boxes V1–Vn initially and the algorithm 110 starts revising from there.

As mentioned, the calibration is rapid. Initial calibration may take a few seconds and updates can often be accomplished in a millisecond. Thereafter, the system can run easily for 100 times as long before calibration is again necessary. If desired, the system can be calibrated continuously and run at the same time but doing so requires more power consumption. The customer will normally dictate when he wants calibration to occur or, more likely, dictate when not to calibrate.

Figure 6:
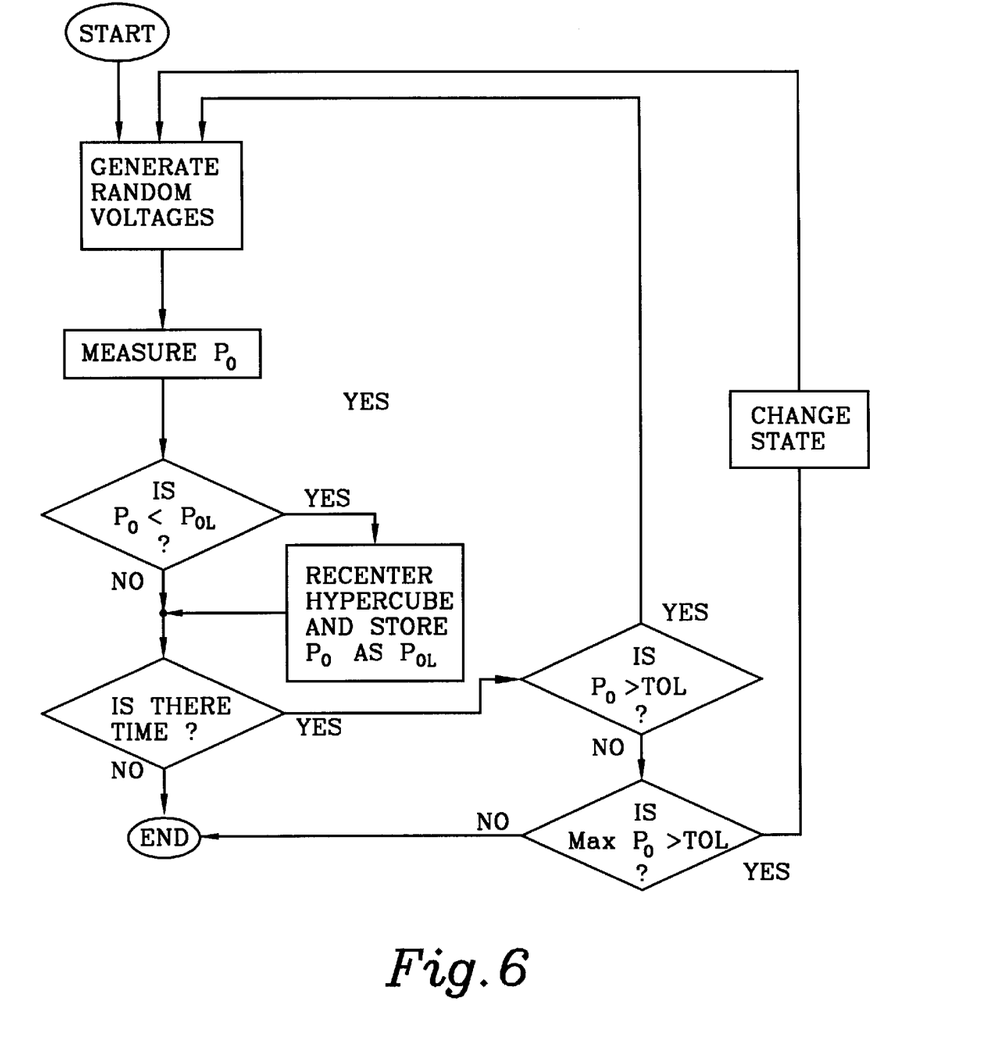
FIG. 6 is a flow diagram of the random search calibration technique.

Referring now to FIG. 6 which shows the flow diagram used for the random search method of setting the switch biases. In FIG. 6, after startup, the system generates random voltages for each switch in the Generate Random Voltages box. When this is done, the system measures $P_0$ and compares it with the previous value, $P_{OL}$. If $P_0$ is greater than $P_{OL}$ then it is determined in the Is There Time? box whether there is enough time to try another calibration. If $P_0$ is less than $P_{OL}$ then the hypercube is reentered and again the question is whether there is enough time to try another calibration if necessary. If there is insufficient time, then the recalibration process ends. If there is enough time, then it is determined whether or not the value of $P_0$ is greater than the tolerance value in the Is $P_0$>TOL? box. If it is, then the Generate Random voltages box causes new voltages to be fed to the switches. These new voltages will be either generated around the old hypercube center (if $P_0$ was greater than $P_{OL}$) or around the new hypercube center (if $P_0$ was smaller than $P_{OL}$) and the calibration performs another loop.

In the event that $P_0$ is less than TOL, indicating that the final output is OK for this state (desired delay) then it must be determined whether or not the final output value $P_0$ for the highest of all of the states is OK since the apparatus is not recalibrated until it is OK for all states that are to be encountered. If the value of the maximum $P_0$ is less than the tolerance value, then the system is OK for all states and the recalibration ends. If not, then the Change States box will initiate another loop using a changed state and the recalibration process continues. The final result is when the value of $P_0$ is not greater than TOL for all states and the calibration process ends.

It should be noted that in some cases, the time remaining runs out during the process of recalibration in which case the system will run on the best values yet obtained.

Another calibration scheme is known as "Gradient Search Calibration" which will be described in connection with FIG. 7. In this method, the system starts by setting the switch conditions to cause the light to pass straight through with minimum delay. The output $P_0$ is measured and is used as a basis for the generation of the gradient of $P_0$ in the bias voltages. The gradient is generated by disturbing each of the switches in turn and getting the change in $P_0$ for each change. Then a step is taken of the length delta V in the direction of steepest descent. The step size is proportional to the error. For example, in one simulation, the step size equal to the 0.569 power (error$^{0.569}$). The step size was varied discretely instead of continuously by using the code:

delta V.=1.0 (if $P_0$<0.2)

delta V=0.4 (if $P_0$<0.04)

delta V=0.16 (if $P_0$<0.008)

delta V=0.064 (if $P_0$<0.0016)

delta V=0.0256 (if $P_0$<0.00032)

delta V=0.01204 (if $P_0$<0.000064)

delta V=0.004096 (if $P_0$<0.0000128)

where $P_0$ is the normalized optical power out of the top fiber 82 in FIG. 5. The last statement scales the step size for the entire search. Various scaling of the step size may be used to find the optimum search rate.

A new $P_0$ is taken and compared to the tolerance and, if the tolerance is not met another attempt is made. If the tolerance is met or after some number of attempts say 500 the tolerance is not met then a search is made over all the combinations of delays and the one with the highest level of leakage is selected for calibration. The delay condition exhibiting the worst leakage is checked against the desired tolerance for the delay line, and if it is less than the tolerance, the calibration is complete. Otherwise, the worst performing combination of switch settings is selected for the next search The flow diagram for the gradient search calibration algorithm is shown in FIG. 7. For purposes of explanation of FIG. 7, it will be assumed that the switches are of the reverse-delta-beta type. In FIG. 7, after startup, the system sets the switches so as to produce zero, or minimum delay i.e. light passes straight through the lower path in the switches and does not go through any of the delay loops. The value of $P_0$ is determined and is made the base to generate a voltage gradient i.e. the voltage vector of length 2 n (for reverse-delta-beta optical switches and In for regular DCS switches). It is desirable for this state (i=0) that $P_0$ be minimum.

In the next box entitled "Select Delta V For Gradient And Step" a change in voltage is determined to be applied to the switches. Accordingly, for i=0 the voltage to switch DCS 1 (Vi) is changed and P0 is again read. Then Vi is changed back and the derivative based on the two $P_0$'s is taken to provide a gradient. Then, in the Take Step Of Size Delta V In Direction Of Gradient box, a step delta V is taken along the gradient and a new $P_0$ is determined. If the new $P_0$ is greater than some arbitrary fraction (assume 0.3) of the tolerance and if the number of times completing the above process has not exceeded some arbitrary maximum, then the new $P_0$ is set back to the "Use $P_0$ As A Base To Generate the Gradient" box and the process is repeated. This continues for i=1 through i=2 n+1 until $P_0$ is less than 0.3 TOL and the count has not reached the maximum, at which point, the left hand portion of FIG. 7 sends a signal to the i=0 to i<$2^n$ box on the right.

Figure 7:
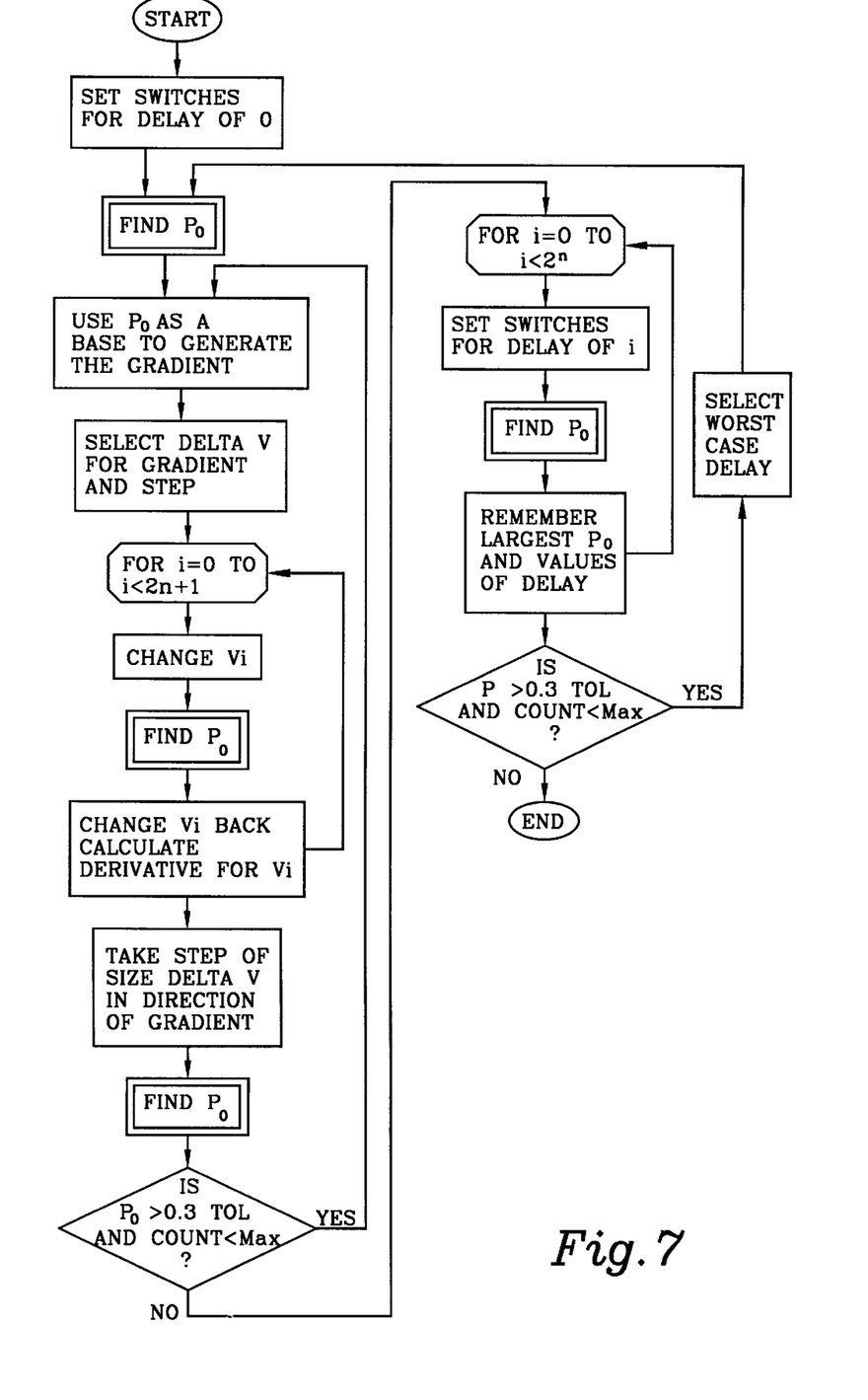
FIG. 7 is a flow diagram of the gradient search calibration technique.

On the right of FIG. 7, the i=0 to i<$2^n$ box selects various delays for which the system is capable of operating. The switches are set to the chosen one of these delays and $P_0$ is again obtained. This signal is presented to a Remember Largest $P_0$ And Value Of Delay" box where the largest $P_0$ and the corresponding delay value is stored. Then if $P_0$ is again greater than an arbitrary fraction (say 0.3) of the tolerance, and the count representing the number of times the procedure has been repeated is less than an arbitrary maximum, the entire procedure is sent back to the first Find $P_0$ box on the left side of FIG. 7 using the $P_0$ for the worst delay and the process keeps going until the final $P_0$ is less than 0.3 TOL and the count has not exceeded the maximum after which the process ends and the switches are presented with the calibrated voltages for the next, or the presently continuing run.

It is seen that we have provided an optical time delay system that corrects for drift in the bias voltages applied to the optical switches and does so with a minimum of equipment so as to conserve space, weight, complexity, power consumption and cost. The system can also calibrate and run because of rapid calibration and can even run while it is being calibrated. The system has utility in any environment where optical time delay is needed and has specific utility for space applications where size, weight, power consumption and complexity are extremely important considerations. Many changes to the preferred embodiments will occur to those skilled in the art as, for example, while optical fibers have been shown in the preferred embodiment, optical integrated circuits may be used, particularly for short delay time situations. We therefore do not intend to be limited by the specific descriptions used in connection with the preferred embodiments.

The embodiments of the invention in which an exclusive property or right is claimed are defined as follows:

1. The method of calibrating a variable optical delay system having a plurality of optical switches each being operable in accordance with an applied bias signal to collectively direct an optical beam along an optical path of variable desired length to produce a final output optical error signal, comprising the steps of:
    A. establishing a first set of applied bias signal and applying them to the switches;
    B. sensing the magnitude of the final output error signal;
    C. comparing the output error signal magnitude to a predetermined tolerance value;
    D. establishing a second set of applied bias signals and applying them to the switches when the final output error signal is greater than the tolerance value; and
    E. repeating steps A, B, C and D utilizing the second set of applied bias signals and continuing to repeat thereafter until a final set of applied bias signals results in the output error signal magnitude being less than the tolerance value.

2. The method of claim 1, further including the step of:
    F. operating the delay system with the final set of applied bias signals obtained in step E to produce the desired delay until a new calibration is required.

3. The method of claim 1 wherein the first set of applied bias signals are all within a predetermined range from an initial value point and Step C includes comparing the value of the output error signal with the value of the previously obtained best output error signal and when it is smaller step D includes changing the initial value point in the direction of the new bias signals and changing the range about the new bias signal set.

4. The method of claim 2 further including the step of:
    G. stopping the repeating of the steps A, B, C and D when there is insufficient time left to assure trial of a new set of applied bias signals in step E an comparing the resulting error signal to the tolerance before step F begins.

5. The method of claim 3 wherein there are a plurality of desired delays each having a set of applied bias signals for the switches and step C includes comparing the largest value of the output error signal in the plurality of delays to the tolerance value and changing to a new delay when the largest value of the output error signal is greater than the tolerance value.

6. The method of claim 1 wherein the first set of applied bias signals are such that the optical beam travels along an optical path of minimum length.

7. The method of claim 6 further including the steps:
    B1. changing the applied bias signals to the switches by a predetermined amount;
    B2. resensing the magnitude of the final output error signal;
    B3. obtaining the gradient between the first sensed final output error signal and the resensed final output error signal; and,
    establishing the second set of applied bias signals in step D by altering the bias signals applied to the switches in a direction of the gradient.

8. The method of claim 7 further including the step of:
    F. repeating steps A through E for path lengths other than the minimum.

9. The method of claim 8 further including the steps of:
    G. remeasuring the final error output after step F until the final error output is less than the tolerance value.

10. Calibration means for a variable optical delay line having first delay means with first and second optic paths of different lengths and first switch means actuable in accordance with a first applied bias signal to connect only one of the first and second paths between an input and a first output to produce a first delay, and second delay means having third and fourth optic paths of different lengths and second switch means actuable in accordance with a second applied bias signal to connect only one of the third and fourth optic paths between the first output and a second output to produce a second delay, the total delay between the input and the second output being equal to the sum of the delays of the first and second delays, comprising:
    sensing means connected to the third output to receive a final signal therein;
    comparing means comparing the final error signal with a predetermined tolerance value; and
    feedback means connected to the first and second switch means and operable when the final error signal is larger than the tolerance value to vary the applied bias signals.

11. Apparatus according to claim 10 wherein the number of delay means and switches is n and the sensing means is connected to the nth switch to receive one of its outputs as the final error signal.

12. Apparatus according to claim 10 wherein the first and second optic paths comprise optic fibers and the second and fourth paths each comprise a length of optic fiber with the fourth path longer than the second path.

13. Apparatus according to claim 12 wherein the fourth path is twice as long as the second path.

14. Apparatus according to claim 11 where each of the n delay means includes a first and second fiber optic member and the length of the second fiber optic members varies in length to produce the delay.

* * * * *